US008418180B2

(12) United States Patent
Bishop et al.

(10) Patent No.: US 8,418,180 B2
(45) Date of Patent: Apr. 9, 2013

(54) THREAD PRIORITY METHOD FOR ENSURING PROCESSING FAIRNESS IN SIMULTANEOUS MULTI-THREADING MICROPROCESSORS (75) Inventors: James Wilson Bishop, Leander, TX (US); Hung Qui Le, Austin, TX (US); Dung Quoc Nguyen, Austin, TX (US); Balaram Sinharoy, Poughkeepsie, NY (US); Brian William Thompto, Austin, TX (US); Raymond Cheung Yeung, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1349 days.

(21) Appl. No.: 12/129,876

(22) Filed: May 30, 2008

(65) Prior Publication Data

US 2008/0294884 A1  Nov. 27, 2008

Related U.S. Application Data (63) Continuation of application No. 11/055,850, filed on Feb. 11, 2005, now Pat. No. 7,631,308.

(51) Int. Cl.
*G06F 9/46* (2006.01)

(52) U.S. Cl.
USPC ............................ 718/102; 718/103; 718/104

(58) Field of Classification Search ........................ None
See application file for complete search history.

(56) References Cited

U.S. PATENT DOCUMENTS 6,269,391 B1   7/2001  Gillespie
7,707,578 B1 *  4/2010  Zedlewski et al. ............ 718/102
8,108,859 B2 *  1/2012  Yokoi et al. .................. 718/100
2004/0215945 A1 * 10/2004  Burky et al. .................. 712/245
2004/0216106 A1 * 10/2004  Kalla et al. ................... 718/100
2006/0136915 A1   6/2006  Aingaran et al.
2006/0168254 A1   7/2006  Norton et al.

OTHER PUBLICATIONS

Mark Funk; Simultaneous Multi-Threading (SMT) on eServer iSeries POWER5™ Processors; May 2004; 19 pages.*
Jon "Hannibal" Stokes; Introduction to Multithreading, Superthreading and Hyperthreading; Oct. 2, 2002; 10 pages.*
Office Action issued for U.S. Appl. No. 11/055,850 dated Mar. 19, 2009.
Notice of Allowance issued for U.S. Appl. No. 11/055,850 dated Jul. 27, 2009.

* cited by examiner

*Primary Examiner* — H. S. Sough
*Assistant Examiner* — Kimberly Jordan
(74) *Attorney, Agent, or Firm* — Yee & Associates, P.C.

(57) ABSTRACT

A method, apparatus, and computer program product are disclosed for ensuring processing fairness in simultaneous multi-threading (SMT) microprocessors. A clock cycle priority is assigned to a first thread and to a second thread during a standard selection state that lasts for an expected number of clock cycles by selecting the first thread to be a primary thread and the second thread to be a secondary thread. If a condition exists that requires overriding, an override state is executed by selecting the second thread to be the primary thread and the first thread to be the secondary thread. The override state is forced to be executed for an override period of time which equals the expected number of clock cycles plus a forced number of clock cycles. The forced number of clock cycles is granted to the first thread in response to the first thread again becoming the primary thread.

14 Claims, 8 Drawing Sheets

FIG. 7B

THREAD PRIORITY METHOD FOR ENSURING PROCESSING FAIRNESS IN SIMULTANEOUS MULTI-THREADING MICROPROCESSORS

This application is a continuation of application Ser. No. 11/055,850, filed Feb. 11, 2005, status pending.

BACKGROUND OF THE INVENTION

1. Technical Field

The present invention is directed to data processing systems and more particularly to microprocessors. Still more specifically, the present invention is directed to a thread priority method, apparatus, and computer program product for ensuring processing fairness in simultaneous multi-threading (SMT) microprocessors that concurrently execute multiple threads during each clock cycle.

2. Description of Related Art

A symmetric multiprocessing (SMP) data processing system has multiple processors that are symmetric such that each processor has the same processing speed and latency. An SMP system has one operating system that divides the work into tasks that are distributed evenly among the various processors by dispatching one software thread of work to each processor at a time. Thus, a processor in an SMP system executes only one thread at a time.

A simultaneous multi-threading (SMT) data processing system includes multiple processors that can each concurrently execute more than one thread at a time per processor. An SMT system has the ability to favor one thread over another when both threads are running on the same processor.

Known systems can include a shared processor where the shared processor is shared among the various processes that are being executed by the system. The shared processor can be either an SMP or SMT type of processor.

A shared processor may be part of a logically partitioned system and shared among the various partitions in the system. These systems typically include firmware, also called a hypervisor, that manages and enforces the partitioning and/or sharing of the processor. For example, a hypervisor may receive a request from the system to dispatch a virtual processor to a physical processor. The virtual processor includes a definition of the work to be done by a physical processor as well as various settings and state information that are required to be set within the physical processor in order for the physical processor to execute the work. In known shared processor systems, the hypervisor supervises and manages the sharing of a physical processor among all of the logical partitions.

A single processor, also called a CPU, typically includes one or more different and separate processor cores. The complexity of the processor core continues to increase as more and more execution units are added to the core. These cores need to keep all of their execution units busy in order to maximize the performance of the cores. One method for maximizing performance is the concurrent execution of multiple threads in a single core. In a simultaneous multithreading core, multiple threads are executed concurrently by the single core. Each thread can request a variable number of instructions to be dispatched to a variable number of execution units.

Some systems permit threads to be assigned a priority level. These priorities may include multiple different levels. These priority levels may be used, for example, to determine the number of clock cycles to allocate to each thread during dispatch. For example, a high priority thread might receive eight cycles while a medium priority thread is granted only four cycles for every eight granted to the high priority thread. A low priority thread might receive only one cycle for every eight granted to the high priority thread.

In addition to the priority levels that might be assigned to threads, during each clock cycle threads are assigned a clock cycle priority that is specified to be either "primary" or "secondary" at dispatch and either "primary" or "secondary" at issue for a particular cycle. Thus, a thread will be assigned a clock cycle priority and may also be assigned a priority level. The clock cycle priority is temporary. The clock cycle priority is a temporary assignment that typically lasts for one clock cycle. The clock cycle priority that is assigned to a thread will typically be different during the next clock cycle. The clock cycle priority that is assigned to a thread will typically change in response to the next clock cycle.

The priority level assigned to a thread is persistent. It does not change in response to the next clock cycle. The priority level will remain the same once it is assigned to a thread.

A cycle priority algorithm controls the selection of which thread is selected to be the primary thread and which thread is to be the secondary thread for the particular cycle. The cycle priority assignment of primary or secondary is separate from the priority levels that might be assigned to a thread as discussed above.

During the dispatch stage, the thread that is assigned to be the primary thread will dispatch to the execution units it requests. In addition, the thread that is assigned to be the secondary thread may also dispatch that same cycle if enough unused execution units are still available, after the dispatch of the primary thread, to service the secondary thread.

During the issue stage, the thread that is assigned to be the primary thread is issued during a clock cycle. The thread that is assigned to be the secondary thread will issue if the resources it needs are available.

A problem can arise when the thread that is assigned to be the primary thread during a particular clock cycle cannot be processed, either during dispatch or issue. Typically, in known systems, processing is stalled while the primary thread waits to be processed, e.g. by being dispatched or issued, even though the secondary thread might be able to be processed.

Therefore, a need exists for a thread cycle assignment priority method, apparatus, and computer program product for ensuring processing fairness in simultaneous multi-threading (SMT) microprocessors.

SUMMARY OF THE INVENTION

A method, apparatus, and computer program product are disclosed in a data processing system for ensuring processing fairness in simultaneous multi-threading (SMT) microprocessors that concurrently execute multiple threads during each clock cycle. A clock cycle priority is assigned to a first thread and to a second thread during a standard selection state that lasts for an expected number of clock cycles. The clock cycle priority assignment is temporary and designed to change automatically after the expected number of clock cycles has been executed. The clock cycle priority is assigned according to a standard selection definition during the standard selection state by selecting the first thread to be a primary thread and selecting the second thread to be a secondary thread for processing during the standard selection state. A determination is made regarding whether a condition exists that requires overriding the standard selection definition. In response to determining that the condition exists, an override state is executed during which the standard selection definition is overridden. During the override state, the second thread is selected to be the primary thread and first thread is selected to be the secondary thread for processing. The override state is forced to be executed for an override period of time. The override period of time equals the expected number of clock cycles plus a forced number of clock cycles. The forced number of clock cycles is granted to the first thread in response to the first thread again becoming the primary thread.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a thread priority method, apparatus, and computer program product for ensuring processing fairness in simultaneous multi-threading (SMT) microprocessors. The SMT microprocessor is capable of concurrently processing multiple threads during the same clock cycle. The following description describes processing two threads during each cycle although those skilled in the art will recognize that the present invention may be used in a system where more than two threads are processed during each cycle.

As used herein, the term "processing" can mean dispatching, issuing, executing, completing, as well as other actions not explicitly listed.

A clock cycle priority is temporarily assigned to each thread for dispatching. A clock cycle priority is also temporarily assigned to each thread for issuing. These clock cycle priorities are temporarily assigned by the dispatch and issue logic, respectively. They are designed to be temporary assignments that typically last for only one clock cycle. When the terms "primary" and "secondary" are used herein, they mean a temporary clock cycle priority assignment.

A dispatch clock cycle assignment register exists within the dispatch logic in which an identifier is stored. The thread that is identified by the identifier that is currently stored in the dispatch register is the "primary" thread for the current clock cycle for dispatch. Typically, the dispatch logic will then store the identifier of the other thread in the dispatch logic's register for the next clock cycle so that the other thread is the "primary" thread for the next clock cycle for dispatch. An identifier that identifies the thread selected to be the primary thread for the current clock cycle is stored in the dispatch assignment register. Thus, whatever thread is identified in the dispatch assignment register is the "primary" thread for the current clock cycle while the other thread that is not identified in the dispatch register is the "secondary" thread for this current clock cycle. The dispatch assignment register is preferably implemented as a hardware register in the dispatch logic.

An issue clock cycle assignment register also exists within the issue logic in which an identifier is stored. The thread that is identified by the identifier that is currently stored in the issue register is the "primary" thread for the current clock cycle for issue, while the other thread not identified by the identifier in the issue register is the secondary thread for this current clock cycle. Typically, the issue logic will then store the identifier of the other thread in the issue logic's register for the next clock cycle so that the other thread is the "primary" thread for the next clock cycle for issue. The issue assignment register is preferably implemented as a hardware register in the issue logic.

During each clock cycle, one of the threads is assigned to be the primary thread and the other thread is assigned to be the secondary thread during that cycle for dispatch. The thread that is assigned to be the primary thread is dispatched first. Thus, the resources needed by the primary thread are assigned to that thread. If there are enough resources left over after the resources are assigned to the primary thread for dispatch, the secondary thread will also be dispatched during that same clock cycle.

In addition, during each clock cycle, one of the threads is assigned to be the primary thread and the other thread is assigned to be the secondary thread during that cycle for issue. The thread that is assigned to be the primary thread is issued first during the current clock cycle. If there are enough resources, the secondary thread will also be issued during the current clock cycle.

A thread that is selected to be the primary thread during a particular clock cycle can be prevented from dispatching. There are many reasons why a thread can be prevented from dispatching. For example, a general purpose register (GPR) dependency, execution unit resource conflicts, architectural sequential requirements, an L1 cache miss can each prevent a thread from dispatching and may prevent the thread from dispatching for many clock cycles.

A primary thread that is prevented from dispatching still prevents the secondary thread from using the execution units the primary thread would have used had it been dispatched.

The present invention provides a clock cycle priority mechanism that overrides the standard thread selection scheme in order to ensure fairness in thread dispatch and/or issue and to ensure that forward progress is made in the processing of each one of the threads.

The standard selection definition is to assign the first thread to be primary and the second thread to be secondary for a standard period of time that includes an expected number of clock cycles. When a condition exists that requires overriding the standard selection definition, this standard selection definition is overridden by assigning the second thread to be primary and the first thread to be secondary for an overridden period of time.

One example of such a condition is when a long latency stall event is detected. When a long latency stall event is, systems may reassign the primary thread so that work may be accomplished by another thread during the wait period. This dynamic reassignment may be based on a predefined set of events, such as a cache miss event. When threads are assigned as primary, secondary and so on, based on a cycle control algorithm, or when they are dynamically reassigned based on a long latency stall event, resources of the processor that are shared among the threads may be repeatedly consumed by one or more threads. This may result in one or more other threads not receiving their predetermined proportion of the processing resources. Additionally, a thread may be vulnerable to being locked out (or prevented from making forward progress) by other threads that continually consume shared resources such that the locked out thread is always stalled by another thread during its predetermined opportunity for resource utilization.

The present invention ensures fairness and forward progress among the threads by forcing this override state to last for the overridden period of time. This overridden period of time equals the standard period of time plus the forced period of time during which the override state was forced. The present invention tracks the number of clock cycles that are executed during the forced period of time.

During the override state, the first thread did not receive its expected number of clock cycles because the standard selection definition was overridden. Once the override state is finished and the standard selection definition is resumed, the number of clock cycles that were executed during the forced period of time is granted back to the first thread in addition to the expected number of clock cycles. Thus, the next time the first thread becomes the primary thread, it will receive the expected number of clock cycles plus the forced number of clock cycles.

When two threads of equal priority are being dispatched and the thread that is assigned to be the primary thread during the particular clock cycle cannot dispatch, the present invention overrides the standard selection scheme. The present invention overrides the standard selection scheme so that the thread originally selected to be the secondary thread is instead made the primary thread, and the thread originally selected to be the primary thread is instead made the secondary thread for the current clock cycle.

The thread assigned to be the primary thread is then allowed to dispatch. The primary thread remains primary until the conflict the other thread had is resolved. Once the conflict is resolved, the assignments are changed such that the thread currently assigned to be the primary thread is now assigned to be the secondary thread and the thread that is currently assigned to be the secondary thread is now assigned to be the primary thread.

In an SMT system that concurrently executes two threads each clock cycle, the two threads can have unequal priority levels. In this case, the thread with the higher priority level will be granted a greater number of clock cycles in which to be dispatched. Thus, the thread with higher priority level has a larger window of time during which to be dispatched.

There are some circumstances where one thread can prevent the other thread from dispatching. For example, there may be a resource conflict such that the thread with the higher priority level prevents the thread with the lower priority level from dispatching until that conflict is resolved. A performance problem can arise in this case when the lower priority level thread is prevented from dispatching by the higher priority level thread. In this case, the lower priority level thread already has a smaller window during which to be dispatched. If that lower priority level thread is prevented from being dispatched when this smaller window opens up, the lower priority level thread can have difficulty making forward progress.

The present invention ensures forward progress will be made when dispatching threads having unequal priority levels. When two threads having unequal priority levels are to be dispatched, the higher priority level thread receives a first number of clock cycles during which to dispatch while the lower priority level thread receives a second number of clock cycles during which to dispatch. The first number of clock cycles is greater than the second number of clock cycles. Thus, the higher priority level thread is selected to be the primary thread and the lower priority level thread is selected to be the secondary thread for the first number of clock cycles. At the end of the first number of clock cycles, the higher priority level thread is then selected to be the secondary thread and the lower priority level thread is then selected to be the primary thread. The higher priority level thread is secondary and the lower priority level thread is primary for the second number of clock cycles.

If the lower priority level thread is prevented from dispatching by the higher priority level thread when the lower priority level thread becomes the primary thread, the present invention will force the lower priority level thread to remain the primary thread until it successfully dispatches. The number of extra clock cycles granted to the lower priority level thread are counted and then granted back to the higher priority level thread when the higher priority level thread is once again selected to be the primary thread. Thus, instead of the first number of clock cycles, the higher priority level thread will be granted the first number of clock cycles plus the extra number of clock cycles when it next becomes the primary thread. Thereafter, during subsequent dispatch cycles, the threads will dispatch with the higher priority level thread being granted the original first number of cycles and the lower priority level thread being granted the second number of cycles.

A thread may have multiple instructions to be executed. Some of the instructions may be part of an instruction stream where the instructions are dependent on other instructions in the stream. In order to optimize performance, these instructions should be issued during consecutive clock cycles. However, typically during issue, the selection of the primary thread and the secondary thread will toggle with each clock cycle. Therefore, in the prior art, performance would be degraded if these instructions in these particular types of instruction streams were not be issued in consecutive cycles.

According to the present invention when one of the threads needs to execute a particular instruction stream, that thread is forced to be the primary thread for consecutive clock cycles until all of the instructions in this instruction stream have executed. Thus, the typically clock cycle priority assignment is overridden so that the instructions can be issued consecutively.

The number of clock cycles that are executed while the typical assignment is overridden is counted. After these instructions are executed, the other thread is assigned to be the primary thread. This thread is then granted extra clock cycles to compensate it for the cycles taken from it during the execution of the particular instruction stream. Thereafter, the typical assignments are resumed, toggling every clock cycle between the two threads.

Most floating point instructions can be pipelined and issued every cycle as the threads toggle between primary and secondary. However, some instructions cannot be pipelined and need to use a particular execution unit. These instructions are multi-cycle instructions that need to issue to one particular execution unit. When both threads need to issue a multi-cycle instruction to the same execution unit, toggling between the threads does not result in the best performance of either thread.

These floating point instructions that are multi-cycle instructions that cannot be pipelined are referred to below as a first special type of instruction. When both threads need to issue multi-cycle instructions that cannot be pipelined and that need to use the same particular execution unit, the present invention assigns one of these threads as the primary thread. The primary thread is then issued. The other thread is assigned to be the primary thread while the instructions of the first thread are executing. The number of clock cycles used by the first thread is counted while the instructions of that thread are being executed. Once the instructions of the first thread have completed being executed, the second thread is issued and is held primary the extra cycles that were used by the first thread.

There is a special case where a STORE instruction issued by a first thread blocks a STORE instruction from the second thread from being issued for a particular number of cycles. The present invention handles this case by forcing the clock cycle priority thread assignments so that the first thread is forced to be the primary thread for a particular number of cycles so that it can pipeline more stores. After the particular number of cycles, the thread assignments are again forced so that the second thread is forced to be the primary thread until it issues plus the particular number of cycles to compensate it for the number of cycles it was forced to be secondary. Also during this time, the first thread is prevented from issuing any more STORE instructions.

Prior to describing the present invention in detail, the following, including the description with reference to FIGS. 1-4, is provided as a description of the environment in which the present invention may be executed.

A superscalar processor includes a number of stages, such as the following, in the processor pipeline. In a typical first stage, referred to as an instruction fetch stage, an instruction is fetched from memory or associative memory structure, each stage including one or more pipelines. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers. This stage is also sometimes called a write back stage since it is at this time that results of the execution of instructions are written back to designated locations such as registers.

Figure 1:
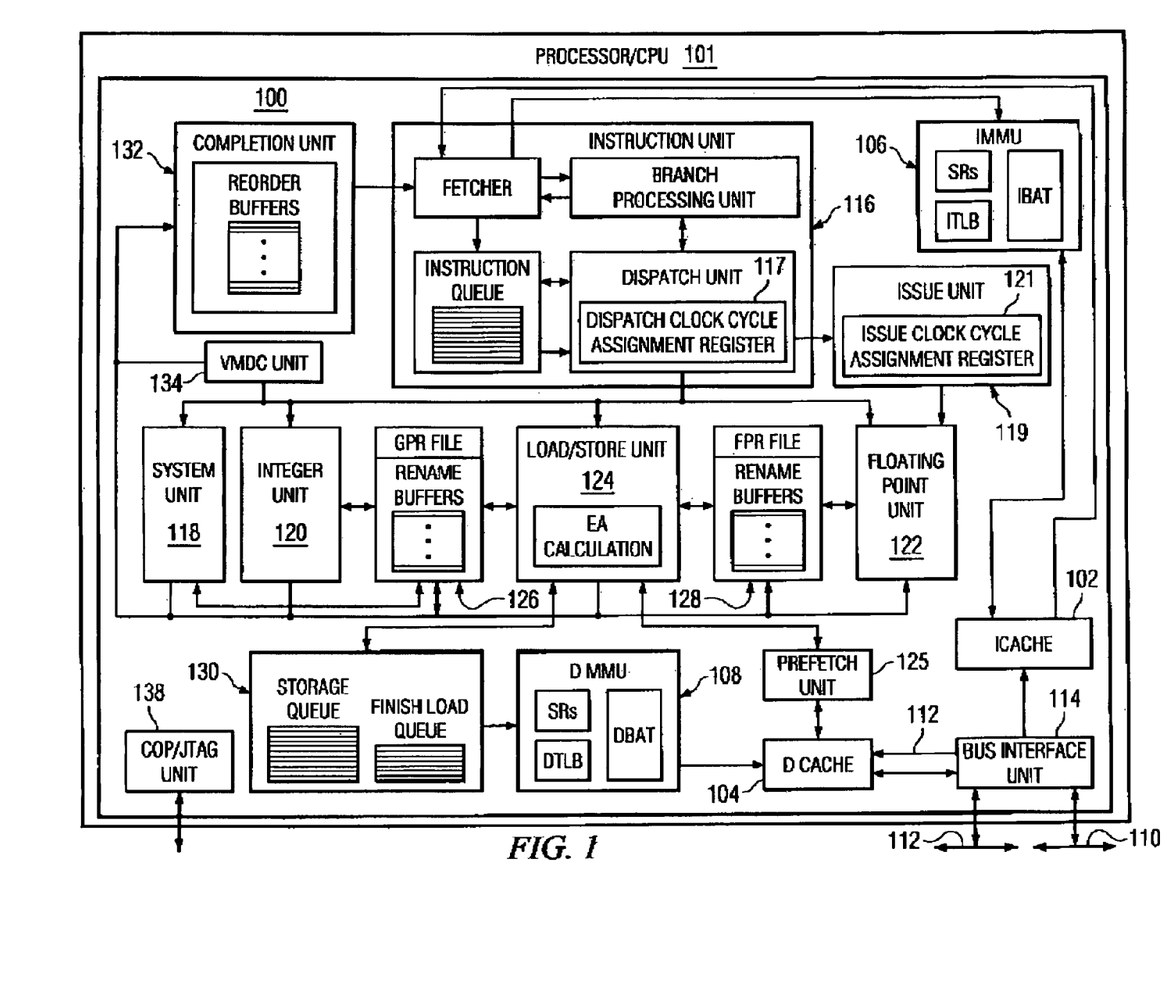
FIG. 1 is a block diagram of a superscalar processor that can be used to implement the present invention in accordance with the present invention.

With reference now to the figures, and in particular with reference to FIG. 1, FIG. 1 depicts a block diagram of a processor core in which a preferred embodiment of the present invention may be implemented. Processor core 100 is included within a processor/CPU 101 that is a single integrated circuit superscalar microprocessor (CPU), such as the PowerPC™ processor available from TBM Corporation of Armonk, N.Y. Accordingly, processor core 100 includes various processing units both specialized and general, registers, buffers, memories, and other sections, all of which are formed by integrated circuitry. Processor core 100 also operates according to reduced instruction set computing ("RISC") techniques.

Processor core 100 includes level one (L1) instruction and data caches ("I Cache" and "D Cache") 102 and 104, respectively, each having an associated memory management unit ("I MMU" and "D MMU") 106 and 108. As shown in FIG. 1, processor core 100 is connected to system address bus 110 and to system data bus 112 via bus interface unit 114. Instructions are retrieved from system memory (not shown) to processor core 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue, and a dispatch unit.

The dispatch unit within instruction unit 116 dispatches instructions as appropriate to execution units such as system unit 118, integer unit 120, floating point unit 122, or load/store unit 124. The dispatch unit includes a dispatch clock cycle assignment register 117.

The dispatch unit outputs instructions to issue unit 119. Issue unit 119 includes an issue clock cycle assignment register 121. Issue unit 119 outputs instructions to floating point unit 122.

System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("CPR File") 126. Floating point unit 122 performs single precision and/or double precision multiply/add operations, retrieving operands from and storing results in floating point registers ("FPR File") 128. VMX unit 134 performs byte reordering, packing, unpacking, and shifting, vector add, multiply, average, and compare, and other operations commonly required for multimedia applications.

Load/store unit 124 loads instruction operands from prefetch unit 125 into integer registers 126, floating point registers 128, or VMX unit 134 as needed, and stores instructions results when available from integer registers 126, floating point registers 128, or VMX unit 134 into data cache 104.

These instruction operands were loaded into prefetch unit 125 from data cache 104. Load and store queues 130 are utilized for these transfers from prefetch unit 125 to and from integer registers 126, floating point registers 128, or VMX unit 134. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor ("COP") and joint test action group ("JTAG") unit 138 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor core 100 may include, for example, multiple integer and floating point execution units to increase processing throughput. All such variations are within the spirit and scope of the present invention.

Figure 2:
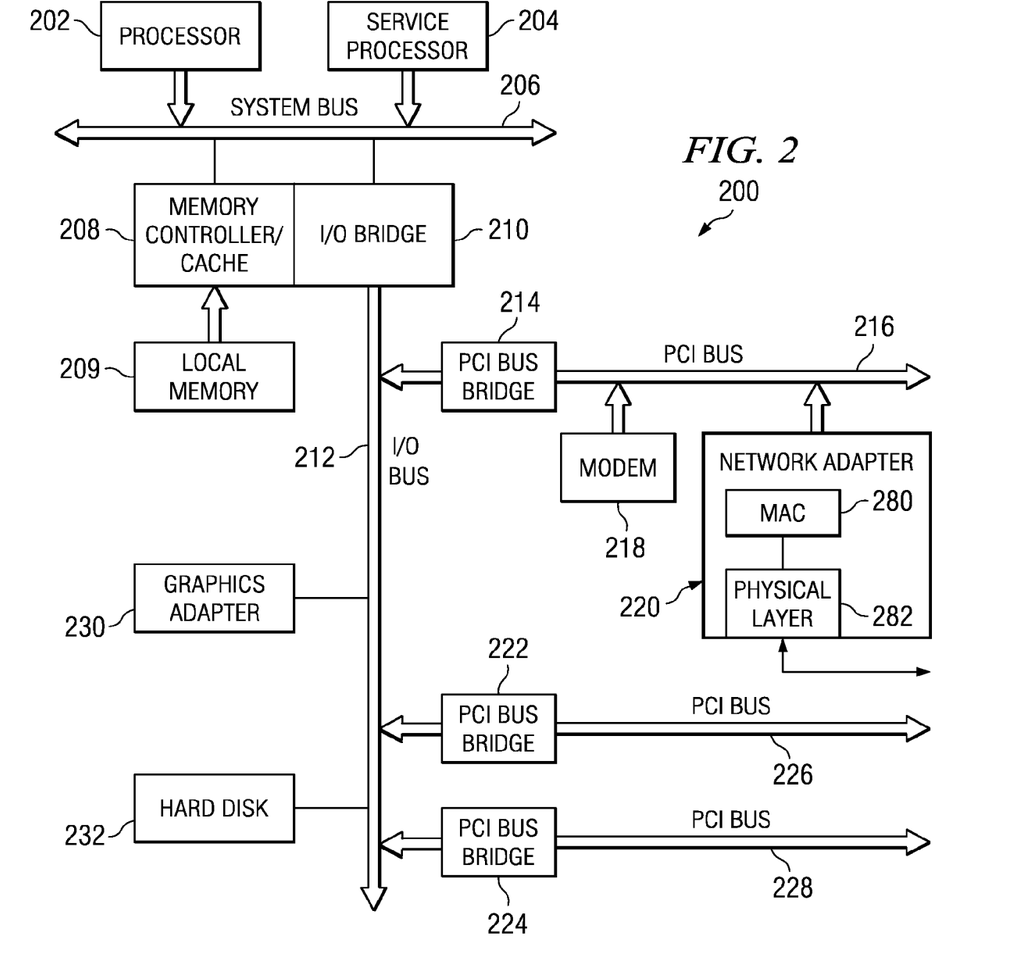
FIG. 2 is an illustration of a computer system which includes a processor, such as the one depicted by FIG. 1, in accordance with the present invention.

FIG. 2 is an illustration of a computer system which includes a processor, such as the one depicted by FIG. 1, in accordance with the present invention. Data processing system 200 may be a symmetric multiprocessor (SMP) system including a plurality of processors 202 and 204 connected to system bus 206. Alternatively, a single processor system may be employed. Each processor 202 and 204 may be an SMT-enabled processor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCT) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example an Ethernet network over an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
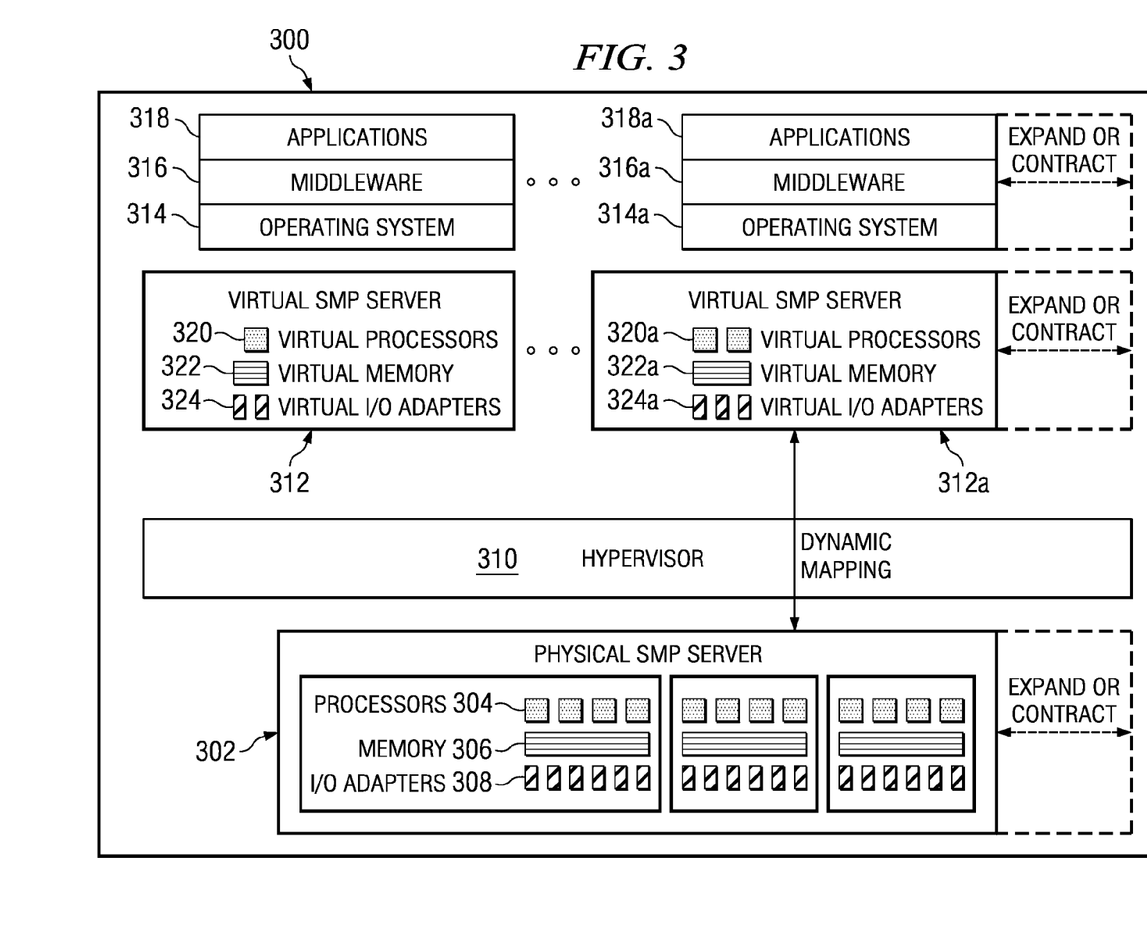
FIG. 3 is a block diagram of a data processing system, including a hypervisor, in which the present invention may be implemented.

FIG. 3 is a block diagram of a data processing system 300, including a hypervisor, in which the present invention may be implemented. System 300 is preferably a symmetric multiprocessing (SMP) server computer system. SMP server computer system 300 includes physical hardware devices that can be mapped to, i.e. temporarily owned by, a user application to execute that application.

SMP server computer system 300 includes a physical SMP server 302. Physical SMP server 302 includes physical hardware devices such as processors 304, memory 306, and T/O adapters 308. These physical devices are managed by hypervisor 310. Each one of the processors 304 is preferably a simultaneous multithreaded (SMT) processor that is capable of concurrently executing multiple different threads on the processor.

A virtual server is a proxy for a physical server that has the same capabilities, interfaces, and state. Virtual servers are created and managed by a hypervisor that resides on physical SMP server computer system 300. A virtual server appears to be a physical SMP server to its user: the operating system, middleware, and application software that run upon it. SMP server computer system 300 includes one or more virtual servers such as virtual server 312 and virtual server 312a.

Each virtual server appears to its software to include its own virtual processors), memory, and I/O adapter(s) that are available for the exclusive use of that virtual server. For example, virtual server 312 includes a virtual processor 320, virtual memory 322, and virtual I/O adapters 324. Virtual server 312a includes virtual processors 320a, virtual memory 322a, and virtual I/O adapters 324a.

Each virtual server supports its own software environment, including an operating system, middleware, and applications. The software environment of each virtual server can be different from the software environment of other virtual servers. For example, the operating systems executed by each virtual server may differ from one another.

For example, virtual server 312 supports operating system 314, middleware 316, and applications 318. Virtual server 312a supports operating system 314a, middleware 316a, and applications 318a. Operating systems 314 and 314a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 310 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 304, is selected by hypervisor 310 to be used to execute and implement that virtual processor. Hypervisor 310 manages the selections of physical devices and their temporary assignment to virtual devices.

Hypervisor 310 is responsible for dynamically creating, managing, and destroying virtual SMP servers. Whole virtual processors, virtual I/O adapters, and virtual memory blocks can be removed or added by hypervisor 310. Hypervisor 310 is also responsible for dynamic resource allocation, managing time-sharing of physical resources, and altering the physical resource mapped to a processor without involving the operating system. Hypervisor 310 is also able to dedicate physical resources to virtual resources for situations where sharing is not desired. Hypervisor 310 is responsible for managing the addition or removal of physical resources. Hypervisor 310 makes these additions and deletions transparent to the upper level applications.

Figure 4:
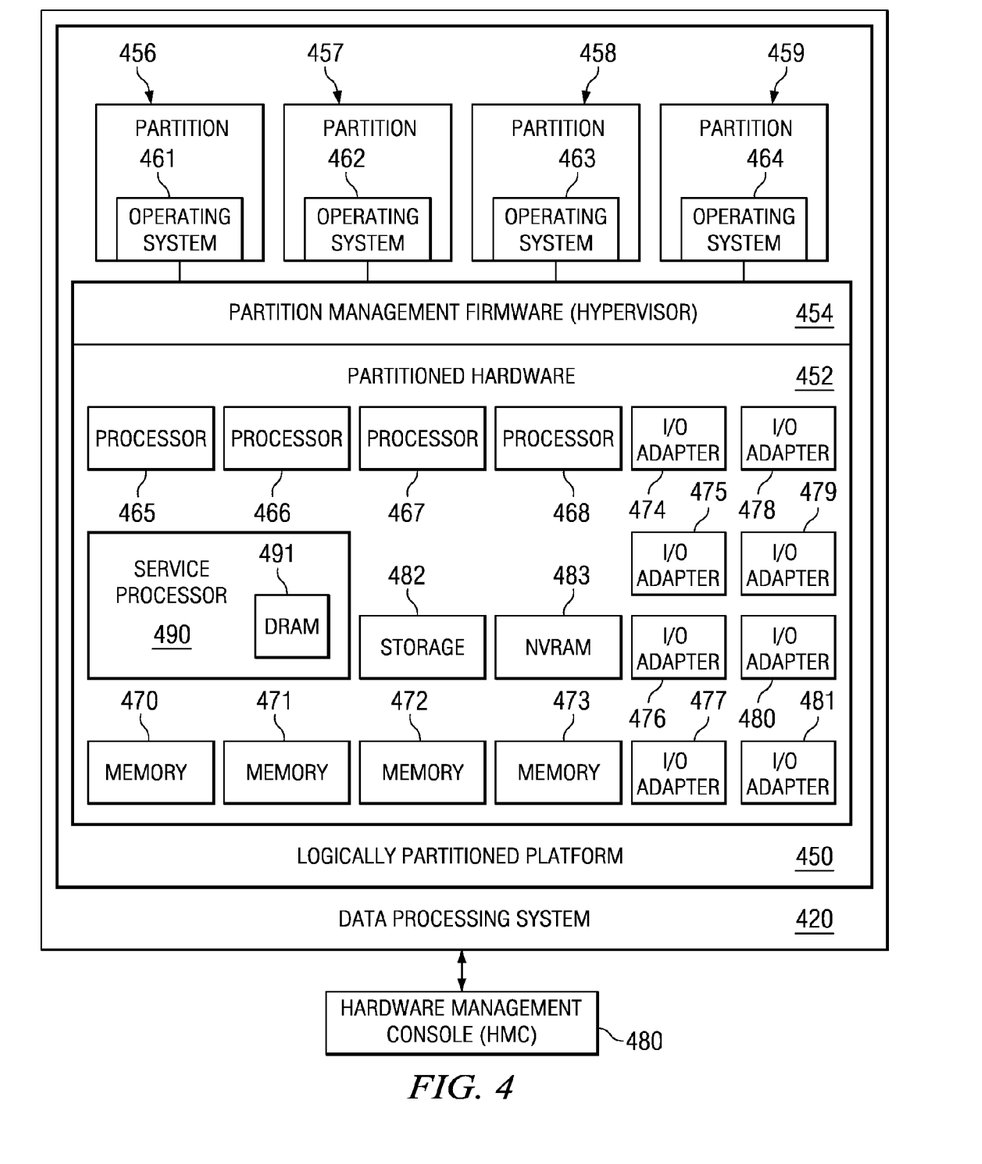
FIG. 4 is a block diagram of a logically partitioned platform that includes the present invention in accordance with the present invention.

FIG. 4 is a block diagram of a logically partitioned platform that includes the present invention. Data processing system 420 includes logically partitioned platform 450. Platform 450 includes partitioned hardware 452, partition management firmware, also called a hypervisor 454, and partitions 456-459. Operating systems 461-464 exist within partitions 456-459. Operating systems 461-464 may be multiple copies of a single operating system or multiple heterogeneous operating systems simultaneously run on platform 450.

Partitioned hardware 452 includes a plurality of SMT-capable processors 465-468, a plurality of system memory units 470-473, a plurality of input/output (I/O) adapters 474-481, and a storage unit 482. Each of the processors 465-468, memory units 470-473, NVRAM storage 483, and I/O adapters 474-481 may be assigned to one of multiple partitions 456-459. Partitioned hardware 452 also includes service processor 490. A non-volatile memory device 491, such as an NVRAM device, is included within service processor 490.

Partition management firmware (hypervisor) 454 performs a number of functions and services for partitions 456-459 to create and enforce the partitioning of logically partitioned platform 450. Hypervisor 454 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM) and non-volatile random access memory (non-volatile RAM). Thus, hypervisor 454 allows the simultaneous execution of independent OS images 461-464 by virtualizing all the hardware resources of logically partitioned platform 450. Hypervisor 454 may attach I/O devices through I/O adapters 474-481 to single virtual machines in an exclusive mode for use by one of OS images 461-464.

A hardware management console (HMC) 480 may be coupled to service processor 490 in data processing system 420. HMC 480 is a separate computer system that is coupled to service processor 490 and may be used by a user to control various functions of system 420 through service processor 490.

Figure 5:
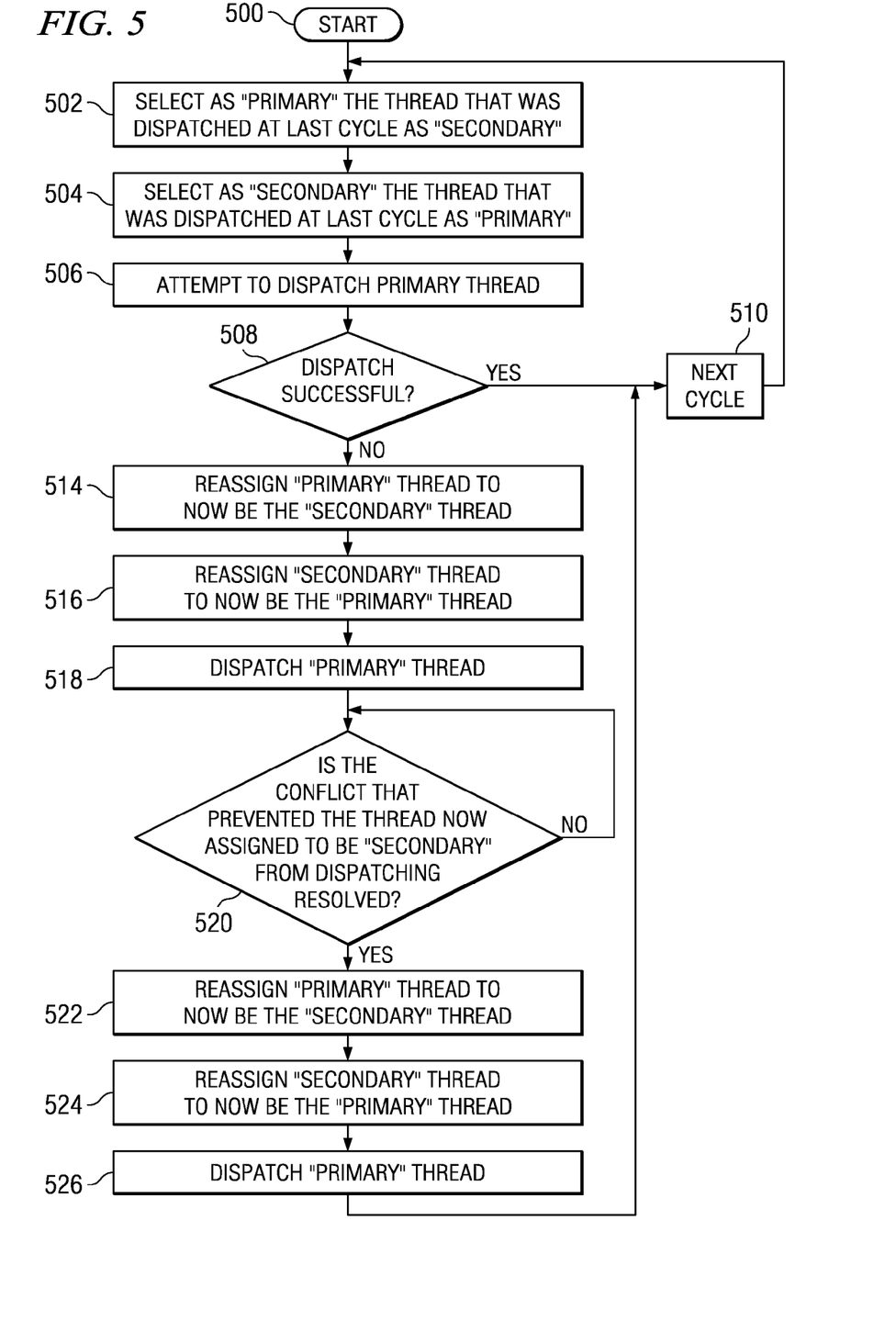
FIG. 5 depicts a high level flow chart that illustrates conditions for overriding a dispatch clock cycle priority assignment when two threads have the same priority level and the thread selected as the primary thread cannot dispatch in accordance with the present invention.

FIG. 5 depicts a high level flow chart that illustrates overriding a dispatch clock cycle priority assignment when two threads have the same priority level and the thread selected as the primary thread cannot dispatch in accordance with the present invention. The process starts as depicted by block 500 and thereafter passes to block 502 which illustrates selecting as the "primary" thread the thread that was dispatched at the last clock cycle as the "secondary" thread. An identifier that identifies the thread selected to be the primary thread is stored in the dispatch assignment register. Thus, whatever thread is identified in the dispatch assignment register is currently the "primary" thread. The other thread is then the "secondary" thread. For example, assume thread A was dispatched at the last clock cycle as the secondary thread. Thread A is then selected as the "primary" thread for this clock cycle. Therefore, an identifier that identifies thread A is stored in the dispatch assignment register.

Next, block 504 depicts selecting as the "secondary" thread the thread that was dispatched at the last clock cycle as the "primary" thread. Following the example from above, thread B was dispatched at the last clock cycle as the primary thread. Therefore, thread B is now the secondary thread. Thereafter, block 506 illustrates attempting to dispatch the primary thread. In this example, an attempt is made to dispatch thread A.

Block 508, then, depicts a determination of whether or not the primary thread was successfully dispatched. In this example, the determination is made regarding whether thread A was dispatched. There may exist some type of conflict that prevents the thread that is selected as the primary thread from dispatching. For example, the primary thread may not dispatch because it requires a particular resource that is not currently available.

Referring again to block 508, if a determination is made that the primary thread was successfully dispatched, the process passes to block 510 which illustrates the next clock cycle occurring. The process then passes back to block 502. During the next pass through blocks 502 and 504, thread B will be selected as the primary thread since it was the secondary thread during the last clock cycle and thread A will be selected as the secondary thread since it was the primary thread during the last clock cycle. Thus, an identifier that identifies thread B will be stored in the dispatch assignment register.

Referring again to block 508, if a determination is made that the primary thread was not successfully dispatched, the process passes to block 514 which depicts reassigning the "primary" thread to now be the "secondary" thread. Following the example given above after the first pass through blocks 502, 504, and 506, since thread A is the primary thread, it is reassigned now to be the secondary thread. Block 516, then, illustrates reassigning the "secondary" thread to now be the "primary" thread. Following the example given above, since thread B is the secondary thread, it is reassigned now to be the primary thread. This reassignment is made by storing a different thread identifier in the dispatch assignment register. Thus, according to the example, an identifier that identifies thread B is stored in the dispatch assignment register.

The process then passes to block 518 which depicts dispatching the thread that is currently selected, or assigned, to be the primary thread. Next, block 520 illustrates a determination of whether or not the conflict has been resolved that prevented the thread that is now assigned to be the secondary thread from dispatching. In the example, this is thread A. Thus, in the example, block 520 depicts a determination of whether the conflict that prevented thread A from dispatching has been resolved.

Referring again to block 520, if a determination is made that the conflict has not been resolved that prevented the thread that is now assigned to be the secondary thread from dispatching, the process passes back to block 520. If a determination is made that the conflict has been resolved that prevented the thread that is now assigned to be the secondary thread from dispatching, the process passes to block 522 which depicts reassigning the thread that is currently the primary thread to be the secondary thread. Continuing with the example from above, this is thread B. Thus, thread B is now assigned to be the secondary thread.

Thereafter, block 524 illustrates reassigning the thread that is currently the secondary thread to be the primary thread. Continuing with the example from above, this is thread A. Thus, thread A is now assigned to be the primary thread. This reassignment is made by storing the identifier that identifies thread A in the dispatch assignment register. Next, block 526 depicts dispatching the thread that is assigned to be the primary thread. According to the example, this is thread A. The process then passes back to block 510.

Figure 6:
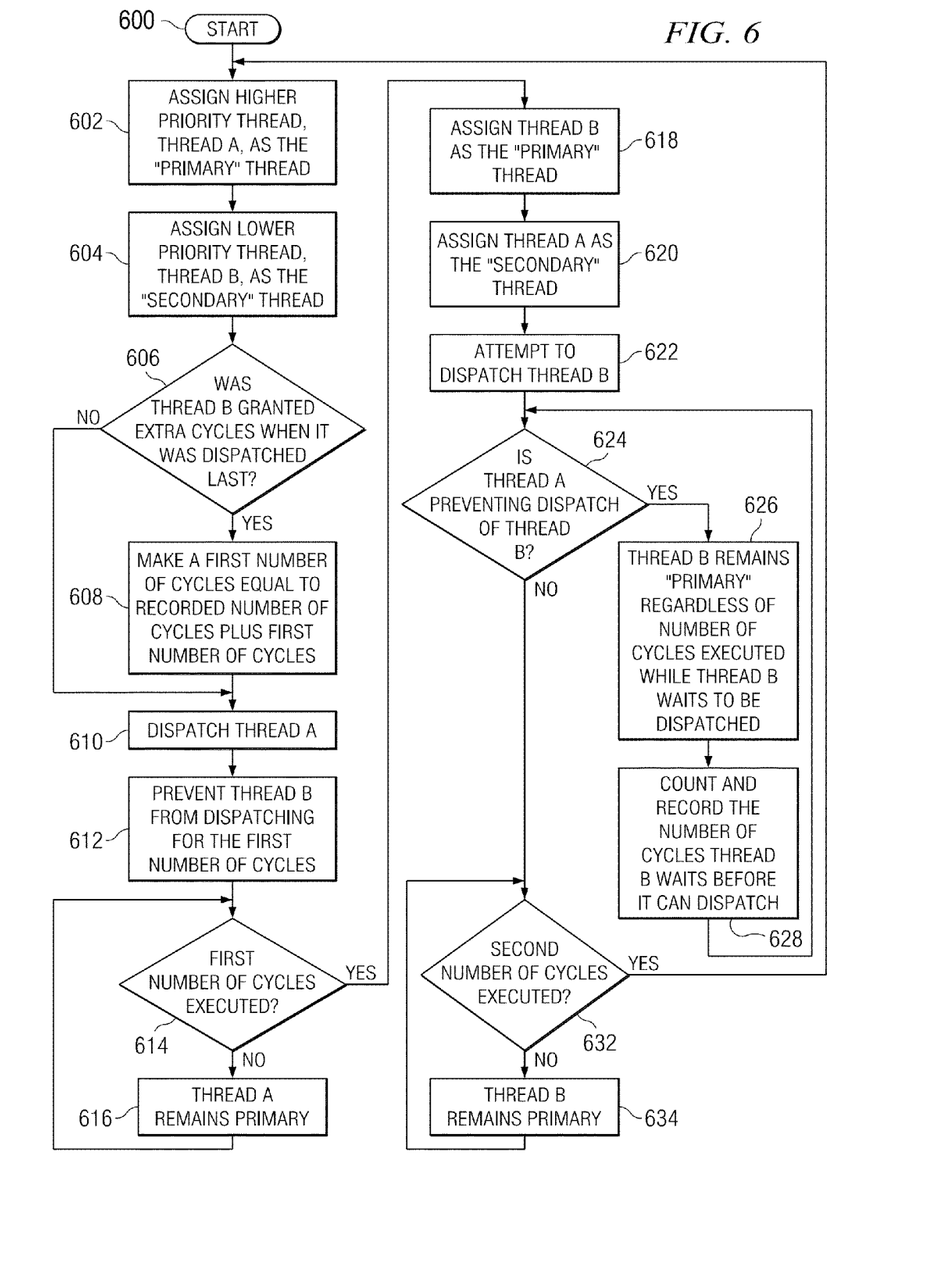
FIG. 6 illustrates a high level flow chart that depicts conditions for overriding a dispatch clock cycle priority assignment when two threads have different priority levels and the thread selected as the secondary thread cannot dispatch during its dispatch window in accordance with the present invention.

FIG. 6 illustrates a high level flow chart that depicts overriding a dispatch clock cycle priority assignment when two threads have different priority levels and the thread selected as the secondary thread cannot dispatch during its dispatch window in accordance with the present invention. The process starts as depicted by block 600 and thereafter passes to block 602 which illustrates assigning the thread with the higher priority level, thread A in this example, as the primary thread. This assignment is made by storing the identifier in the dispatch assignment register of the thread that is assigned to be the primary thread, e.g. thread A in this case. Next, block 604 depicts assigning the thread with the lower priority level, thread B in this example, as the secondary thread.

Block 606, then, illustrates a determination of whether or not thread B was granted extra clock cycles when it was last dispatched. If a determination is made that thread B was not granted extra cycles, the process passes to block 610. Referring again to block 606, if a determination is made that thread B was granted extra clock cycles the last time it was dispatched, the process passes to block 608 which depicts making a first number of cycles equal to the recorded number of cycles plus the original first number of cycles.

The two threads, thread A and thread B, are assigned different priority levels for dispatch. In the example given, thread A is the thread with the higher priority level and as a result will receive a larger ratio of the clock cycles than thread B will receive. For example, thread A may receive eight clock cycles for dispatch and then thread B will receive one clock cycle. At this point, thread A is again dispatched and is granted another eight clock cycles. At the end of the eight cycles, thread B would be dispatched and granted one clock cycle. Thus, for this example, the original first number of cycles is equal to eight, and a second number of cycles is equal to one.

Referring again to block 606, if thread B was granted extra clock cycles the last time it dispatched, these extra cycles are added to the first number of clock cycles. For example, if thread B had been granted three clock cycles, these two extra cycles would be added to the eight clock cycles resulting in the first number of cycles being equal to ten.

The process then passes to block 610 which illustrates dispatching thread A. Block 612, then, depicts preventing thread B from dispatching for the first number of cycles. If thread B was not granted extra cycles, this first number of cycles will be equal to the original first number of cycles. If thread B was granted extra cycles, this first number of cycles will be greater than the original first number of cycles.

Thereafter, block 614 illustrates a determination of whether or not the first number of clock cycles has completed executing. If a determination is made that the first number of clock cycles has not completed executing, the process passes to block 616 which depicts thread A remaining assigned as the primary thread. The process then passes back to block 614.

Referring again to block 614, if a determination is made that the first number of cycles has completed executing, the process passes to block 618 which illustrates assigning thread B as the primary thread. This assignment is made by storing the identifier of thread B in the dispatch assignment register. Block 620, then, depicts assigning thread A as the secondary thread. Next, block 622 illustrates attempting to dispatch thread B.

The process then passes to block 624 which depicts a determination of whether or not thread A is preventing thread B from dispatching. If a determination is made that thread A is preventing thread B from dispatching, the process passes to block 626 which illustrates thread B remaining as the primary thread regardless of the number of cycles executed while thread B waits to be dispatched. Next, block 628 depicts counting and recording the number of cycles that thread B has to wait before it is dispatched. This number will be added to the first number of cycles when thread A is next dispatched so that thread A receives back the extra time it was forced to be the secondary thread. The process then passes back to block 624.

Referring again to block 624, if a determination is made that thread A is not preventing thread B from dispatching, the process passes to block 632 depicts a determination of whether or not the second number of cycles has been executed. If a determination is made that the second number of cycles has not completed executing, the process passes to block 634 which depicts thread B remaining as the primary thread. The process then passes back to block 632. Referring again to block 632, if a determination is made that the second number of cycles has completed executing, the process passes back to block 602.

Figure 7A:
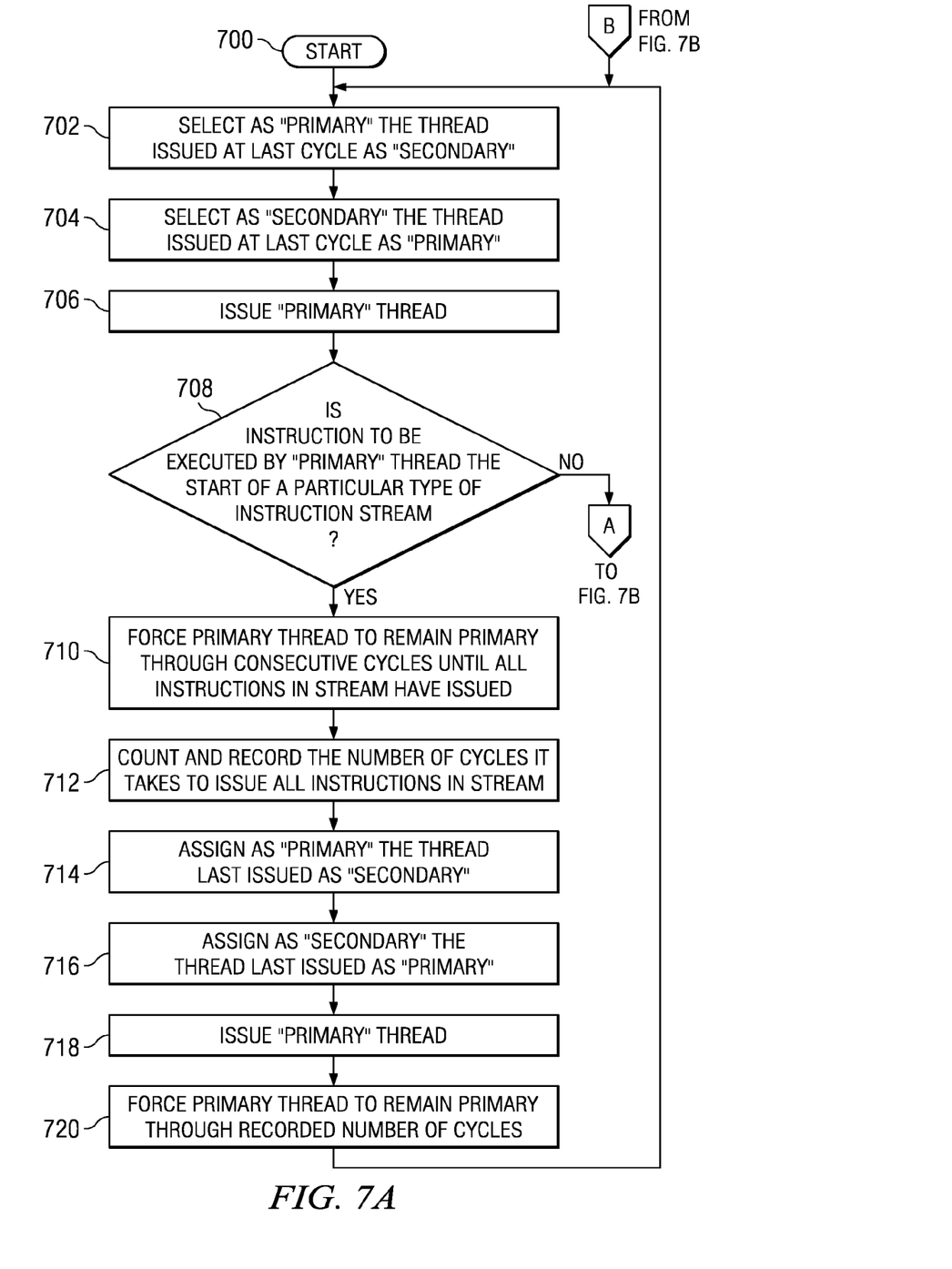
FIGS. 7A and 7B together depict a high level flow chart that illustrate conditions for overriding an issue clock cycle priority assignment when the thread selected as the primary thread is executing particular types of instructions in accordance with the present invention.
Figure 7B:
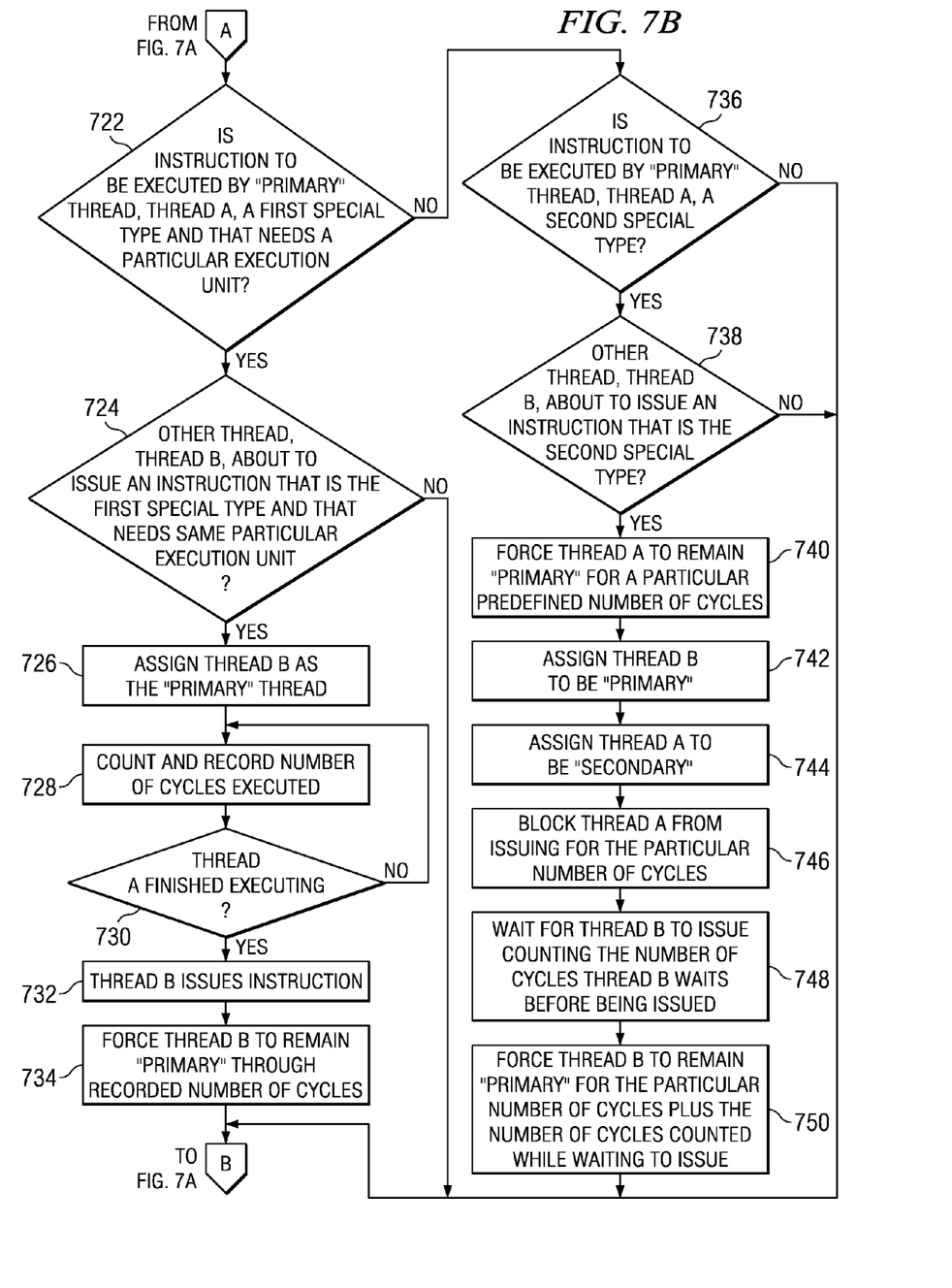

FIGS. 7A and 7B together depict a high level flow chart that illustrate overriding an issue clock cycle priority assignment when the thread selected as the primary thread is executing particular types of instructions in accordance with the present invention. The process starts as depicted by block 700 and thereafter passes to block 702 which illustrates selecting as the primary thread the thread that was issued at the last clock cycle as the secondary thread. This assignment is made by storing the identifier in the issue assignment register of the thread that is assigned to be the primary thread. Next, block 704 depicts selecting as the secondary thread the thread that was issued at the last clock cycle as the primary thread.

The process then passes to block 706 which illustrates issuing the primary thread. Thereafter, block 708 depicts a determination of whether or not the instruction to be executed by the primary thread is the start of a particular type of instruction stream. An example of such a particular type of instruction stream is an instruction stream that includes instructions that are dependent on each other and that should be issued in consecutive clock cycles to achieve the best performance.

One example of such an instruction stream is a sequence of a floating point arithmetic instruction, a STORE instruction, and then a LOAD instruction. Of course, those skilled in the art will recognize that the particular type of instruction stream can be any specified instruction stream. The particular type of instruction stream could be different in each implementation of the present invention.

If a determination is made that the instruction to be executed by the primary thread is the start of a particular type of instruction stream, the process passes to block 710 which illustrates forcing the primary thread to remain as the primary thread through consecutive cycles until all instructions in the instruction stream have issued. A particular thread is forced to remain as the primary thread by ensuring that the thread identifier that is stored in the issue assignment register continues to identify that particular thread.

Thereafter, block 712 depicts counting and recording the number of cycles it takes to issue all of the instructions in this instruction stream. Next, block 714 illustrates assigning as the primary thread the thread that last issued as the secondary thread. This assignment is made by storing the identifier in the issue assignment register of the thread that is assigned to be the primary thread. Block 716, then, depicts assigning as the secondary thread the thread that last issued as the primary thread. Thereafter, block 718 illustrates issuing the primary thread. Next, block 720 depicts forcing the primary thread to remain as the primary thread through the recorded number of cycles. Again, a particular thread is forced to remain as the primary thread by ensuring that the thread identifier that is stored in the issue assignment register continues to identify the particular thread. The process then passes back to block 702.

Referring again to block 708, if a determination is made that the instruction to be executed by the primary thread is not the start of a particular type of instruction steam, the process passes to block 722 as depicted through connector A. Block 722 illustrates a determination of whether or not the instruction to be executed by the primary thread, e.g. thread A, is a first special type of instruction that needs a particular execution unit. For example, an example of a first special type of instruction is an instruction that cannot be pipelined, such as a multi-cycle instruction.

If a determination is made that the instruction to be executed by the primary thread, e.g. thread A, is a first special type of instruction that needs a particular execution unit, the process passes to block 724 which illustrates a determination of whether or not the other thread, in the example this would be thread B, is about to issue an instruction that is the first special type of instruction and that also needs the same particular execution unit. If a determination is made that the other thread, e.g. thread B, is not about to issue an instruction that is the first special type of instruction and that also needs the same particular execution unit, the process passes back to block 702 as depicted by connector B.

Referring again to block 724, if a determination is made that the other thread, e.g. thread B, is about to issue an instruction that is the first special type of instruction and that also needs the same particular execution unit, the process passes to block 726 which illustrates assigning thread B as the primary thread. Next, block 728 illustrates counting and recording the number of cycles that have executed.

Thereafter, block 730 depicts a determination of whether or not thread A has finished executing. If a determination is made that thread A has not finished executing, the process passes to block 728. Referring again to block 730, if a determination is made that thread A has finished executing, the process passes to block 732 which illustrates thread B issuing its instruction. Next, block 734 depicts forcing thread B to remain primary through the recorded number of cycles. The process then passes back to block 702 as depicted through connector B.

Referring again to block 722, if a determination is made that the instruction to be executed by the primary thread, e.g. thread A, is not a first special type of instruction that needs a particular execution unit, the process passes to block 736. Block 736 illustrates a determination of whether or not the instruction to be executed by the primary thread, e.g. thread A, is a second special type of instruction. For example, in systems where a STORE instruction issued by a first thread to one execution unit can block a STORE instruction from the second thread from being issued to another execution unit for a particular number of cycles, this STORE instruction is an example of the second type of instruction.

If a determination is made that the instruction to be executed by the primary thread, e.g. thread A, is not a second special type of instruction, the process passes back to block 702 as depicted through connector B.

Referring again to block 736, if a determination is made that the instruction to be executed by the primary thread, e.g.

thread A, is a second special type of instruction, the process passes to block 738 which illustrates a determination of whether or not the other thread, thread B in this example, is about to issue an instruction that is the second special type of instruction. If a determination is made that the other thread, thread B in this example, is not about to issue an instruction that is the second special type of instruction, the process passes back to block 702 as depicted through connector B.

Referring again to block 738, if a determination is made that the other thread is about to issue an instruction that is the second special type, the process passes to block 740 which illustrates forcing thread A to remain primary for a particular predetermined number of cycles. In this case, thread B is being blocked from issuing due to the STORE instruction that thread A is executing. Next, block 742 illustrates assigning thread B to be the primary thread. The process then passes to block 744 which depicts assigning thread A to be the secondary thread. Block 746, then, illustrates blocking thread A from issuing for the particular number of cycles. Thereafter, block 748 depicts waiting for thread B to issue. The number of cycles is counted that thread B has to wait before it is issued. Next, block 750 illustrates forcing thread B to remain the primary thread for the particular number of cycles plus the number of cycles that were counted while thread B waited to issue. The process then passes back to block 702 as depicted through connector B.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a simultaneous multi-threading (SMT) microprocessor that executes multiple threads concurrently during each clock cycle, said method comprising:
assigning a clock cycle priority to a first thread and to a second thread during a standard selection state that lasts for an expected number of clock cycles, wherein said clock cycle priority assignment is temporary and designed to change automatically after said expected number of clock cycles have been executed;
assigning said clock cycle priority according to a standard selection definition during said standard selection state by selecting said first thread to be a primary thread and selecting said second thread to be a secondary thread for processing during said standard selection state;

determining whether a condition exists that requires overriding said standard selection definition;

in response to determining that said condition exists, executing an override state for an override period of time, wherein said second thread is selected to be said primary thread and said first thread is selected to be said secondary thread for processing during said override state, wherein said override state lasts longer than said selection state, and further wherein said second thread is processed and accomplishes work during said override period of time;

forcing said override state to be executed for said override period of time, wherein said override period of time equals said expected number of clock cycles plus a forced predefined number of a plurality of consecutive clock cycles;

counting said forced predefined number of the plurality of consecutive clock cycles that were executed during said override period of time;

granting said expected number of clock cycles plus said forced predefined number of said plurality of consecutive clock cycles to said first thread a next time said first thread becomes said primary thread, wherein said expected number of clock cycles are consecutive to said forced predefined number of the plurality of consecutive clock cycles, and wherein said expected number of clock cycles is less than the combination of said expected number of clock cycles and said forced predefined number of the plurality of consecutive clock cycles;

assigning a first priority level to said first thread;

assigning a second priority level to said second thread, wherein said first priority level is higher than said second priority level, wherein said first thread is granted a larger ratio of clock cycles as compared to said second thread during processing of said first and second threads, wherein said first thread is granted a first number of clock cycles and said second thread is granted a second number of clock cycles;

processing said first thread as said primary thread;

preventing said second thread from processing for a particular number of clock cycles;

assigning said first thread as said secondary thread and said second thread as said primary thread;

attempting to process said second thread as said primary thread;

preventing, by said first thread, said second thread from processing;

forcing said second thread to remain as said primary thread regardless of a wait number of clock cycles that are executed while said second thread is prevented from processing; and in response to said first thread no longer preventing said second thread from processing, processing said second thread for a total number of clock cycles that equal said second number of clock cycles plus said wait number of clock cycles.

2. The method according to claim 1, further comprising:
using said clock cycle priority to determine which thread to dispatch with first priority during said current clock cycle.

3. The method according to claim 1, further comprising:
using said clock cycle priority to determine which thread to issue with first priority during said current clock cycle.

4. The method according to claim 1, further comprising:
assigning said clock cycle priority by storing an identifier that identifies said primary thread in a clock cycle priority assignment register;

during each clock cycle, identifying a thread that is assigned to be said primary thread by reading current contents of said clock cycle priority assignment register, wherein a thread that is identified by said identifier is temporarily assigned as said primary thread; and wherein a thread that is not identified by said identifier is temporarily assigned as said secondary thread.

5. The method according to claim 1, further comprising:
in response to a completion of said total number of clock cycles, assigning said first thread to be said primary thread; and processing said first thread as said primary thread for a second total number of clock cycles, wherein said second total number is equal to said first number of clock cycles plus said wait number of clock cycles.

6. The method according to claim 1, further comprising:
granting resources from a resource pool to said primary thread before granting resources to said secondary thread from any resources of said resource pool that remain after granting said resources to said primary thread.

7. An apparatus comprising:
a simultaneous multi-threading (SMT) microprocessor that executes multiple threads concurrently during each clock cycle; said apparatus comprising:

a clock cycle priority assigned to a first thread and assigned to a second thread during a standard selection state that lasts for an expected number of clock cycles, wherein said clock cycle priority assignment is temporary and designed to change automatically after said expected number of clock cycles have been executed;

said clock cycle priority assigned according to a standard selection definition during said standard selection state by selecting said first thread to be a primary thread and selecting said second thread to be a secondary thread for processing during said standard selection state;

said microprocessor executing code for determining whether a condition exists that requires overriding said standard selection definition;

in response to determining that said condition exists, said microprocessor executing code for executing an override state for an override period of time, wherein said second thread is selected to be said primary thread and said first thread is selected to be said secondary thread for processing during said override state, wherein said override state lasts longer than said selection state, and further wherein said second thread is processed and accomplishes work during said override period of time;

said microprocessor executing code for forcing said override state to be executed for said override period of time, wherein said override period of time equals said expected number of clock cycles plus a forced predefined number of a plurality of consecutive clock cycles;

said microprocessor executing code for counting said forced predefined number of the plurality of consecutive clock cycles that were executed during said override period of time;

said microprocessor executing code for granting said expected number of clock cycles plus said forced predefined number of said plurality of consecutive clock cycles to said first thread a next time said first thread becomes said primary thread, wherein said expected number of clock cycles are consecutive to said forced predefined number of the plurality of consecutive clock cycles, and wherein said expected number of clock cycles is less than the combination of said expected number of clock cycles and said forced predefined number of the plurality of consecutive clock cycles;

said microprocessor executing code for assigning a first priority level to said first thread;

said microprocessor executing code for assigning a second priority level to said second thread, wherein said first priority level is higher than said second priority level, wherein said first thread is granted a larger ratio of clock cycles as compared to said second thread during processing of said first and second threads, wherein said first thread is granted a first number of clock cycles and said second thread is granted a second number of clock cycles;

said microprocessor executing code for processing said first thread as said primary thread;

said microprocessor executing code for preventing said second thread from processing for a particular number of clock cycles;

said microprocessor executing code for assigning said first thread as said secondary thread and said second thread as said primary thread;

said microprocessor executing code for attempting to process said second thread as said primary thread;

said microprocessor executing code for preventing, by said first thread, said second thread from processing;

said microprocessor executing code for forcing said second thread to remain as said primary thread regardless of a wait number of clock cycles that are executed while said second thread is prevented from processing; and in response to said first thread no longer preventing said second thread from processing, said microprocessor executing code for processing said second thread for a total number of clock cycles that equal said second number of clock cycles plus said wait number of clock cycles.

8. The apparatus according to claim 7, further comprising:
said clock cycle priority for determining which thread to dispatch with first priority during said current clock cycle.

9. The apparatus according to claim 7, further comprising:
said clock cycle priority for determining which thread to issue with first priority during said current clock cycle.

10. The apparatus according to claim 7, further comprising:
a clock cycle priority assignment register for assigning said clock cycle priority by storing an identifier that identifies said primary thread in said clock cycle priority assignment register;

during each clock cycle, said clock cycle priority assignment register for identifying a thread that is assigned to be said primary thread by reading current contents of said clock cycle priority assignment register, wherein a thread that is identified by said identifier is temporarily assigned as said primary thread; and wherein a thread that is not identified by said identifier is temporarily assigned as said secondary thread.

11. The apparatus according to claim 7, further comprising:
in response to a completion of said total number of clock cycles, said microprocessor executing code for assigning said first thread to be said primary thread; and said microprocessor executing code for processing said first thread as said primary thread for a second total number of clock cycles, wherein said second total number is equal to said first number of clock cycles plus said wait number of clock cycles.

12. The apparatus according to claim 7, further comprising:
said microprocessor executing code for granting resources from a resource pool to said primary thread before granting resources to said secondary thread from any resources of said resource pool that remain after granting said resources to said primary thread.

13. A method in a simultaneous multi-threading (SMT) microprocessor that executes multiple threads concurrently during each clock cycle, said method comprising:
assigning a clock cycle priority to a first thread and to a second thread during a standard selection state that lasts for an expected number of clock cycles, wherein said clock cycle priority assignment is temporary and designed to change automatically after said expected number of clock cycles have been executed;

assigning said clock cycle priority according to a standard selection definition during said standard selection state by selecting said first thread to be a primary thread and selecting said second thread to be a secondary thread for processing during said standard selection state;

determining whether a condition exists that requires overriding said standard selection definition by determining whether an instruction to be processed by said first thread is a start of a particular instruction stream;

in response to determining that said condition exists, executing an override state for an override period of time, wherein said second thread is selected to be said primary thread and said first thread is selected to be said secondary thread for processing during said override state, wherein said override state lasts longer than said selection state, and further wherein said second thread is processed and accomplishes work during said override period of time;

forcing said override state to be executed for said override period of time, wherein said override period of time equals said expected number of clock cycles plus a forced predefined number of a plurality of consecutive clock cycles;

counting said forced predefined number of the plurality of consecutive clock cycles that were executed during said override period of time;

granting said expected number of clock cycles plus said forced predefined number of said plurality of consecutive clock cycles to said first thread a next time said first thread becomes said primary thread, wherein said expected number of clock cycles are consecutive to said forced predefined number of the plurality of consecutive clock cycles, and wherein said expected number of clock cycles is less than the combination of said expected number of clock cycles and said forced predefined number of the plurality of consecutive clock cycles;

wherein said standard selection definition requires said clock cycle priority to toggle with each subsequent clock cycle between said first and second threads; and in response to determining that said instruction to be processed by said first thread is said start of said particular instruction stream, forcing said first thread to be said primary thread for a particular number of consecutive clock cycles.

14. The method according to claim 13, further comprising:
in response to a completion of said particular number of consecutive clock cycles, assigning said second thread to be said primary thread; and processing said second thread for said particular number of consecutive clock cycles.

* * * * *